United States Patent
Critsinelis et al.

(10) Patent No.: US 6,685,393 B1
(45) Date of Patent: Feb. 3, 2004

(54) METHOD FOR INSTALLING AN UNDERSEA CATENARY RISER

(75) Inventors: Antonio C. F. Critsinelis, Kingwood, TX (US); Renato M. C. da Silva, Rio de Janeiro (BR); Vinícius R. Braga, Rio de Janeiro (BR)

(73) Assignee: Petroleo Brasileiro S.A., Petrobras (BR)

( * ) Notice: Subject to any disclaimer, the term of this patent is extended or adjusted under 35 U.S.C. 154(b) by 0 days.

(21) Appl. No.: 09/656,998

(22) Filed: Sep. 7, 2000

(Under 37 CFR 1.47)

(30) Foreign Application Priority Data

Sep. 8, 1999 (BR) .............................. 9904117

(51) Int. Cl.[7] .................................................. F16L 1/12
(52) U.S. Cl. ................. 405/166; 405/168.1; 405/168.3; 405/170
(58) Field of Search ................... 405/158, 166, 405/167, 168.1, 168.3, 169, 170; 175/220, 85; 414/22.51, 22.55, 22.58, 22.68, 22.71

(56) References Cited

U.S. PATENT DOCUMENTS

| | | | |
|---|---|---|---|
| 4,260,287 A | * | 4/1981 | Uyeda et al. ............ 405/168.1 |
| RE30,846 E | * | 1/1982 | Lang et al. ............. 405/168.1 |
| 4,345,855 A | * | 8/1982 | Uyeda et al. ............ 405/168.1 |
| 4,789,108 A | * | 12/1988 | Recalde ..................... 405/166 |
| 5,527,134 A | * | 6/1996 | Recalde ................... 405/168.3 |
| 5,533,834 A | * | 7/1996 | Recalde ................... 405/168.3 |
| 5,836,719 A | * | 11/1998 | Martin et al. .............. 405/166 |
| 5,971,666 A | * | 10/1999 | Martin et al. ........... 405/168.1 |
| 5,975,802 A | * | 11/1999 | Willis ........................ 405/166 |

FOREIGN PATENT DOCUMENTS

| | | | | |
|---|---|---|---|---|
| GB | 2334048 A | * | 8/1999 | .......... E21B/17/01 |
| WO | WO 01/18349 A1 | * | 3/2001 | .......... E21B/17/01 |

* cited by examiner

*Primary Examiner*—Thomas B. Will
*Assistant Examiner*—Alexandra K. Pechhold
(74) *Attorney, Agent, or Firm*—Nixon & Vanderhye PC

(57) ABSTRACT

A method for launching a steel catenary riser (SCR) from the seabed to the surface comprising three stages. During the first stage, joints are continually welded to the metal pipe resting on the seabed to form the length of the steel catenary riser (SCR) in contact with the seabed. In the second stage a length of pipe previously wound onto a receiving device is welded to the free end of the last joint welded and then it is unwound and launched to form the intermediate length of the steel catenary riser (SCR). In the third stage joints are again welded to the intermediate length of the steel catenary riser (SCR) to form the top length of the said steel catenary riser (SCR).

30 Claims, 8 Drawing Sheets

METHOD FOR INSTALLING AN UNDERSEA CATENARY RISER

BACKGROUND OF THE INVENTION

1. Field of the Invention

This invention relates to a method for installing an undersea metal pipe rising in a catenary, especially metal pipes which are used to deliver oil and gas originating from undersea wells and/or gathering lines to a floating unit.

2. Description of the Related Art

As a result of the growing demand for oil and gas, and due to the natural exhaustion of conventional producing regions, offshore oil and gas prospecting and production has increased greatly in recent years.

New hydrocarbon producing provinces have appeared as a consequence of this increase in prospecting work. Initially, platforms fixed on the sea floor were used to receive the output from producing wells and perform primary processing, and output was generally discharged to gathering stations located on shore, relatively close to the producing region, using rigid metal pipes.

Connection between producing wells and platforms was generally by means of special flexible pipes, of relatively high cost. More recently, as a way of reducing costs, there has been a change to the use of rigid metal pipes to deliver the output from wells to primary treatment units located on fixed platforms.

With wells located at increasingly greater water depths (over 600 m) coming into production, it has been necessary to use floating units to accommodate the primary treatment units for the oil and gas produced.

This has created a problem with the use of rigid metal pipes for the delivery of output, because floating units undergo constant movement at the surface, which makes it difficult to use such rigid metal pipes. A change has therefore been made to the use of a hybrid system, in which the greater length of the production flow line extending from the well to a specific point close to a floating unit comprises rigid metal piping, of lower cost, and a section rising from the seabed to the floating unit (known to specialists as a "RISER") comprising special flexible pipe of higher cost.

Various methods are known for installing rigid metal pipe on the seabed. Of these, a method characterized in that sections of rigid metal pipe are welded together continuously on an onshore base, with the pipe obtained in this way being wound onto a large diameter drum, deforming plastically, has become prominent. This method of winding is known to specialists as "REELING".

Long lengths of pipe which are produced on shore at a very low cost are obtained in this way, thus avoiding having to make most of the special welds for connecting the metal pipe on the deck of the launching vessel, thus reducing the time for which these vessels are used and consequently reducing the final cost.

During the operation of launching pipe wound on drums the curvature of the pipe is reversed through the use of straighteners located in a pipe handling unit appropriate for this purpose, which is normally located at the stern of the vessel.

This method has proved to be the most economical and most efficient for installing rigid metal pipe on the seabed.

In more recent years, after intense technological research and development, use of rigid metal pipes to form the ascending length (riser) connecting the length of pipe on the seabed to the floating unit has come to be considered as a replacement for special flexible pipes. This length, which would comprise a rigid metal pipe in a catenary configuration, is known by the abbreviation SCR (STEEL CATENARY RISER).

The rigid ascending length (RISER) of steel has some advantages over a flexible riser, because of its lower material cost, and also because its installation constitutes a natural extension of the undersea pipe located on the seabed. In principle, the same vessel which is responsible for installing the rigid metal pipe on the seabed could install a rigid catenary riser.

However, this gives rise to a problem. The rigid catenary riser is subject to severe cyclical loads due to the movements of the floating unit, and as a consequence fatigue resistance becomes a fundamental property if a rigid catenary riser is to be able to offer problem-free operation, particularly at the welded joints.

In this respect use of the reeling method has proved unsuitable, because the plastic deformation which occurs in the undersea metal pipe material can give rise to serious consequences, in terms of stress concentration and the growth of defects which would be acceptable for undersea metal pipes supported on the seabed but unacceptable for rigid catenary risers.

To overcome this problem a method known by specialists as "J-lay" is used, and this basically comprises welding metal pipes to each other on the launching vessel itself at the time when they are launched. The pipe is launched in a position which is close to vertical, which guarantees that it is installed within the elastic limit, thus avoiding occurrence of the abovementioned problems relating to the reeling method.

Although the J-lay method is a good solution, it has the disadvantage of being quite slow, and, as a consequence, has a high cost, due to prolonged use of the pipe launching vessel.

Therefore, when an undersea metal pipe which comprises a section supported on the ocean bed and a section rising as a catenary has to be installed it is necessary to use two separate vessels, one which uses the reeling method to install the section supported on the ocean bed, and a second vessel using the J-lay method to install the catenary length. This considerably increases the total cost of installing undersea metal pipe.

New solutions therefore have to be developed for launching rigid metal catenary risers, and these must offer high performance and a low operating cost. This invention presents a solution which addresses these two requirements.

SUMMARY OF THE INVENTION

This invention relates to a method for installing an undersea metal catenary riser pipe, which in general terms comprises:

initially launching, by means of a launching vessel, a length of metal pipe which will be supported on the ocean bed, the said length of metal pipe previously welded and wound onto a recipient device, being unrolled from the recipient device and passing through a straightener pulled by a puller located on a launching ramp on the said launching vessel before being laid on the seabed, the method additionally comprising the following stages:
a) when the said launching vessel is prepared to perform the final operation of laying the length of metal pipe on the seabed, a length of previously welded metal pipe of a length equivalent to the length required for an intermediate stretch of undersea metal catenary riser pipe has to be wound onto the innermost layer of the recipient device, and the remainder of the metal pipe which will be laid on the seabed has to be wound as the outer layer, b) after the final length of metal pipe has been launched, the end which will be connected to the catenary riser is supported by a supporting bracket, c) a first section is then fitted in the said launching ramp and coupled to the said end of the metal pipe which is connected to the catenary riser suspended by a supporting bracket, d) the operations of joining, pre-heating, welding, weld inspection and coating of the said section are then performed at a working station located between the puller and the supporting bracket, e) the supporting bracket is then operated so that it momentarily leaves the suspended metal pipe unsupported, and the latter is then suspended by means of a supporting and lowering system connected to the upper end of the said section, f) the support and lowering system is then operated in order to enable the section which has just been welded to be launched together with the metal pipe until its upper end is located at the said workstation, in such a way that a new section can be welded to it, g) the said supporting bracket is then operated to compress the recently fitted section, supporting the weight of the entire suspended metal pipe and the recently fitted section, h) the said support and lowering system is then disconnected from the upper part of the recently fitted section so that the next section which is to be fitted can be handled, i) the above stages referred to by c, d, e, f, g, h are repeated in such a way that a sufficient number of sections are coupled together in order to obtain the previously determined length of the section of pipe which will form the length of the catenary riser pipe which will be in contact with the seabed, j) after the last section in the length in contact with the seabed has been welded, one end of the previously welded length of metal pipe of a length equivalent to the length required for an intermediate length of the catenary riser pipe which has previously been wound as the innermost layer on the recipient device and which forms the said intermediate length is then welded to the upper end of the last section, k) from this point the intermediate length of the catenary riser pipe is unwound from the recipient device and passed through a straightener, pulled by a puller, located on a launching ramp on the said launching vessel, before being launched, l) after all the intermediate length of the catenary riser has been launched it will be necessary to launch the final critical length of the top of the catenary riser pipe, repeating the stages referred to above by c, d, e, f, g, h until the length of the top stretch of the catenary riser pipe has been completed.

Accordingly, the present invention provides a method of attaching a first pipe section to a pre-reeled pipe, the method comprising:

unreeling said pre-reeled pipe so as to launch it in the sea from a vessel;

supporting in a first support located on said vessel said unreeled pipe near a top end thereof;

attaching said first pipe section to the end of said supported pipe using attaching means on said vessel.

Further, the invention provides a method of attaching a pre-reeled pipe to a pipe section, the method comprising:

supporting in a first support located on a vessel said pipe section near a top end thereof;

unreeling part of said pre-reeled pipe on said vessel;

attaching one end of said pre-reeled pipe to the end of said supported pipe section using attaching means on said vessel.

Furthermore, the invention provides a vessel for launching two types of piping which together constitute an underwater pipe system, said vessel comprising:

a reel for holding at least one length of coiled piping;

guiding/retaining apparatus comprising:

a pipe straightener for straightening the coiled piping as it is unreeled;

a puller for urging the pipe in a substantially downward direction;

a support for holding the pipe and supporting the pipe's weight;

said vessel further comprising a launching ramp for presenting discrete straight pipe sections to said guiding/retaining apparatus;

a working station providing the apparatus necessary to connect separate pipe sections together.

In addition, the invention provides an undersea pipe system comprising:

a section of pipe on the sea bed having a characteristic stress profile which has been formed from a coiling/straightening process;

a first series of pipe sections connected to said sea bed section, said first series of pipe sections not having the characteristic stress profile typical of coiled and straightened pipe sections;

a further section of coiled and straightened piping connected to said first series of pipe sections;

a second series of pipe sections connected to said further section of coiled and straightened piping, said second series of pipe sections not having said characteristic stress profile;

wherein said second series of pipe sections is connected to a floating unit.

BRIEF DESCRIPTION OF THE DRAWINGS

The features of this invention will be better understood from the following detailed description, given merely by way of example, which should be read in conjunction with the accompanying schematic drawings, in which.

DESCRIPTION OF THE INVENTION

Figure 1:
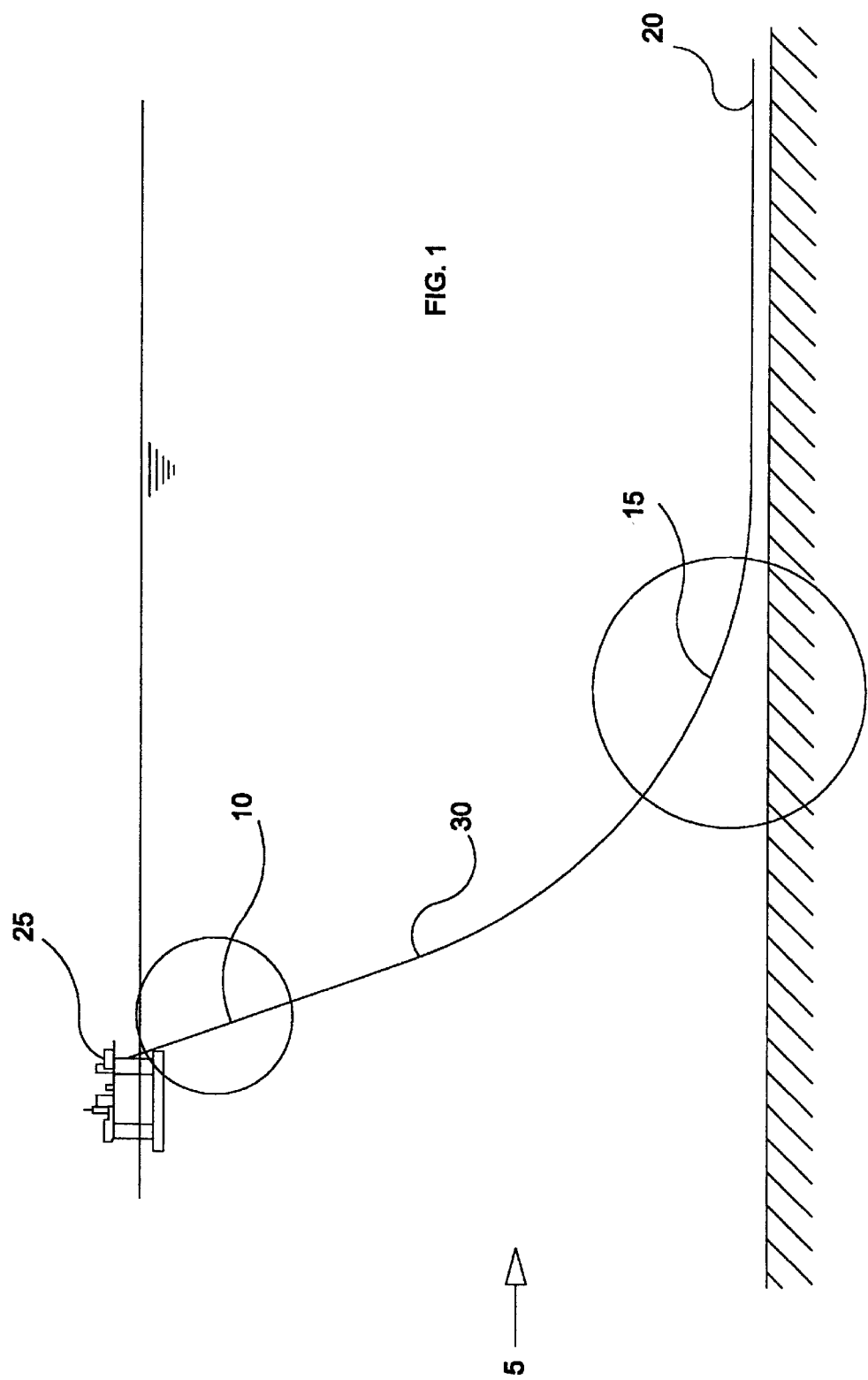
FIG. 1 is a side view showing a metal catenary riser pipe joining an undersea pipe to a floating unit.

FIG. 1 shows diagrammatically a catenary metal riser pipe (steel catenary riser—SCR) 5 joining an undersea pipe 20 to a floating unit 25. As already mentioned above, steel catenary risers represent a lower cost alternative to conventional flexible riser pipes, although up to now it has normally been necessary to use two different types of vessels to install the length located on the seabed and the length rising to the surface.

The vessel which installs the riser pipe typically welds the sections of the lowered pipe together by means of welding equipment located on the descent ramp. The word "section" refers to at least one metal pipe prepared in an onshore operations base to undergo the process of welding on the launching vessel. Usually a section comprises more than one metal pipe welded together at the onshore operations base.

As already mentioned, this process is slow, and as a consequence costly, because the vessel remains in operation for a relatively long period to lower a relatively short length of flexible metal pipe, in comparison with the reeling method of launching.

Research performed by the applicant shows that the problem of fatigue in steel catenary risers (SCR) becomes seriously intensified in two critical lengths, the length at the top of the riser pipe, indicated by reference number 10 in FIG. 1, and the length in contact with the sea bottom (touch down region—TDR), indicated by reference number 15 in FIG. 1, the intermediate length between these two lengths being indicated by reference number 30.

Figure 2:
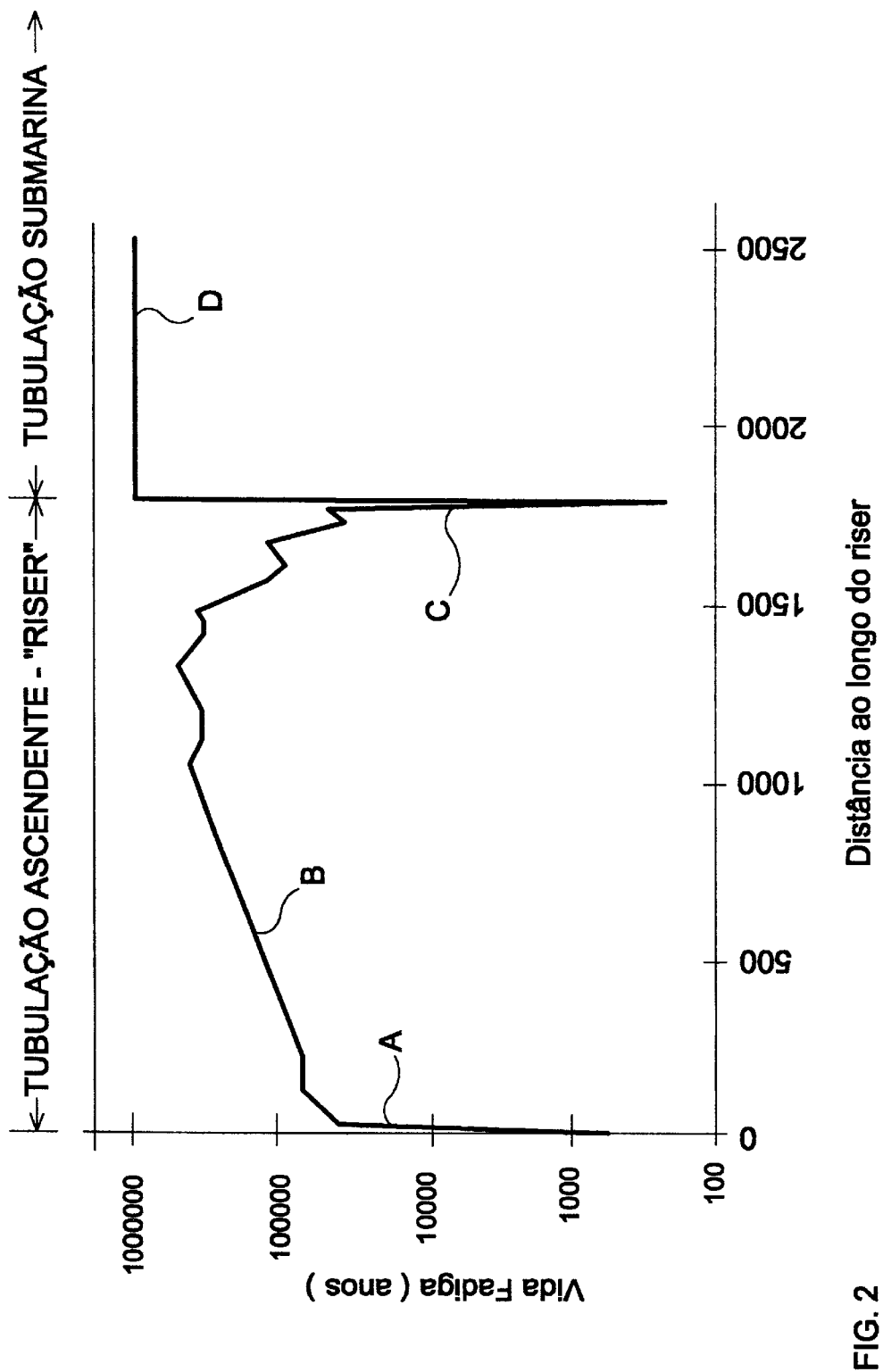
FIG. 2 is a graph showing the service life (fatigue life) of different sections of the riser pipe.

FIG. 2 shows a graphical representation of the results of tests performed to determine the service life of lengths of catenary riser pipe (SCR) 5 in relation to fatigue. The region indicated by A refers to the length at the top of the catenary riser (SCR) 5; the region indicated by C refers to the length of the catenary riser (SCR) 5 in contact with the seabed (TDR); the region indicated by B refers to the intermediate length of the catenary riser (SCR) 5; and the region indicated by D refers to the undersea pipe resting on the seabed.

Tests made have shown that the service life of the intermediate length of catenary riser (SCR) 5 is approximately ten (10) times greater than the service life of the top length, and between 250 and 300 times greater than that of the length in contact with the seabed (TDR), as can be seen in the graph in FIG. 2.

Thus, it has been concluded that the fatigue resistance requirements of the intermediate length of catenary riser pipe (SCR) 5 are quite similar to those considered for undersea metal pipes resting on the seabed. Therefore, the plastic deformation which occurs in the undersea metal pipe material arising from the reeling and unreeling process in the reeling method for laying undersea metal pipes does not represent a significant problem for this intermediate length of catenary riser (SCR) 5.

The present invention comprises a hybrid method in which the undersea metal pipe is lowered to the seabed using the reeling method until the point where the length of catenary riser (SCR) 5 which is in contact with the seabed (TDR) begins (region 15 in FIG. 1). From this point onwards straight sections that are not pre-reeled on a spool (i.e., non-pre-reeled) are welded by the J-lay method until the critical length in contact with the seabed (TDR) has been passed. Then the reeling method is again used to launch the intermediate length of catenary riser (SCR) 5 until the point where the top length starts is reached (region 10 in FIG. 1), when the J-lay method is again used to weld the last joints of catenary riser (SCR) 5.

It should be emphasized that in accordance with the present invention the same vessel which carries out launching via the reeling method also carries out the launching via the J-lay method, with adaptations to the launching apparatus so that both methods can be used.

Figure 3:
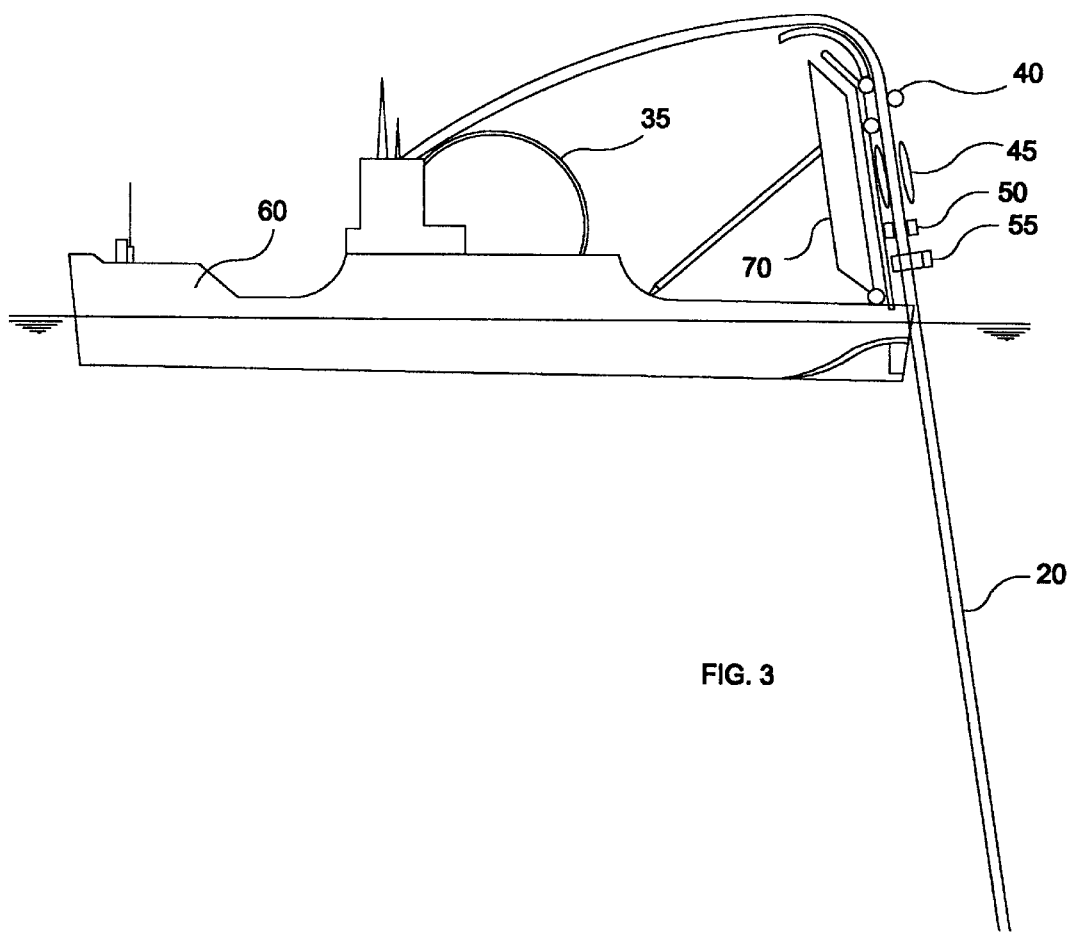
FIG. 3 is a side view showing a metal pipe being launched by the reeling method.
Figure 4:
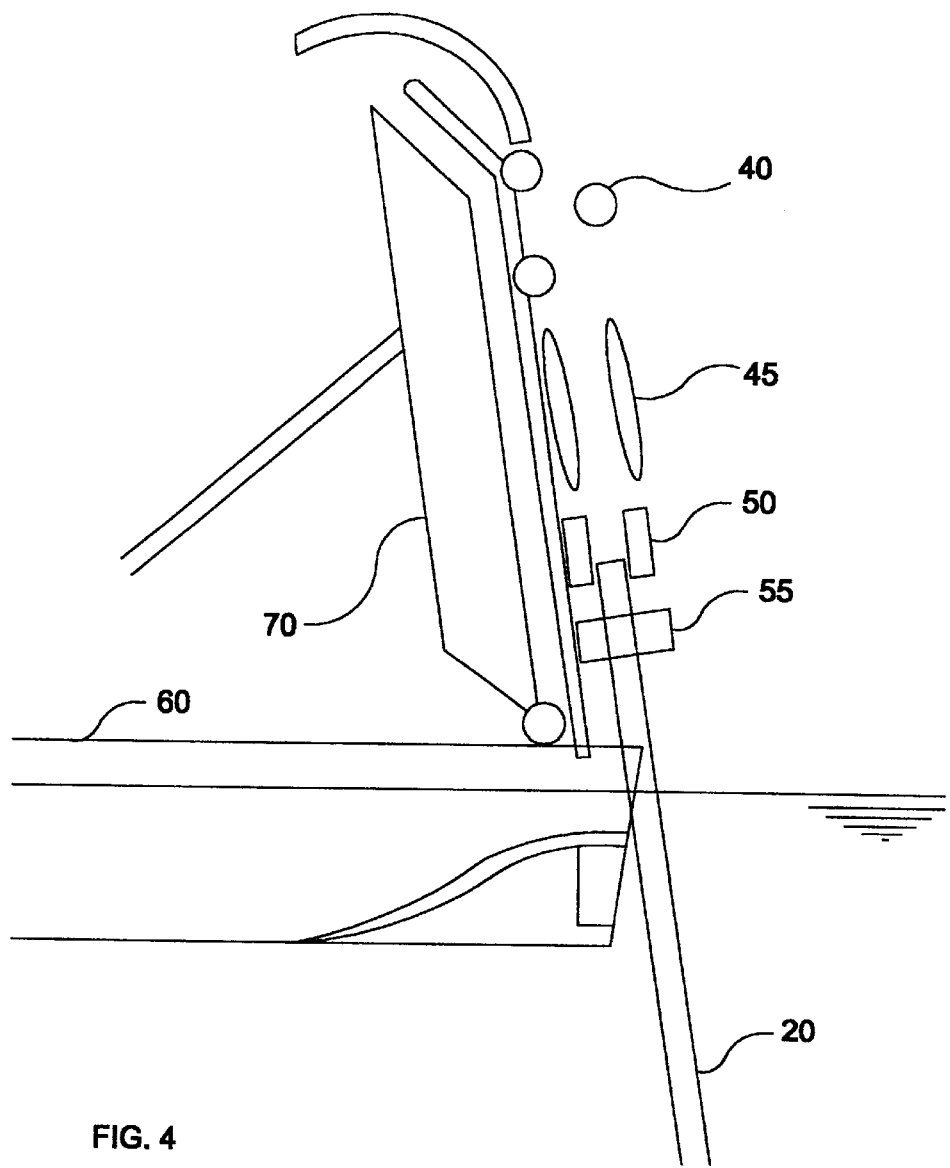
FIG. 4 is a close-up of the device shown in FIG. 3 showing one end of the metal pipe being supported by a supporting bracket.
Figure 5:
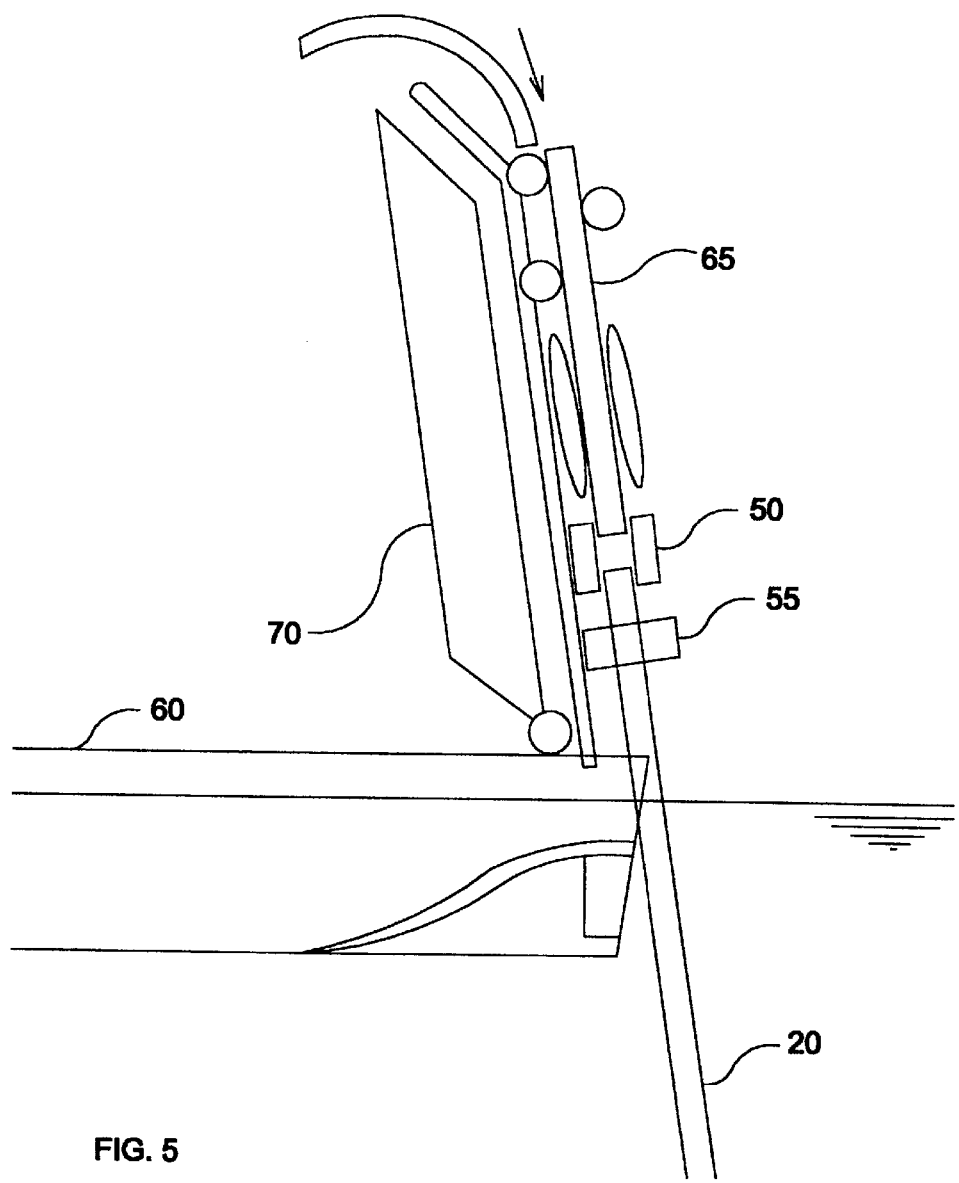
FIG. 5 is a close-up side view showing the start of the process of welding one length of metal pipe to the metal pipe suspended by the suspension bracket.
Figure 6:
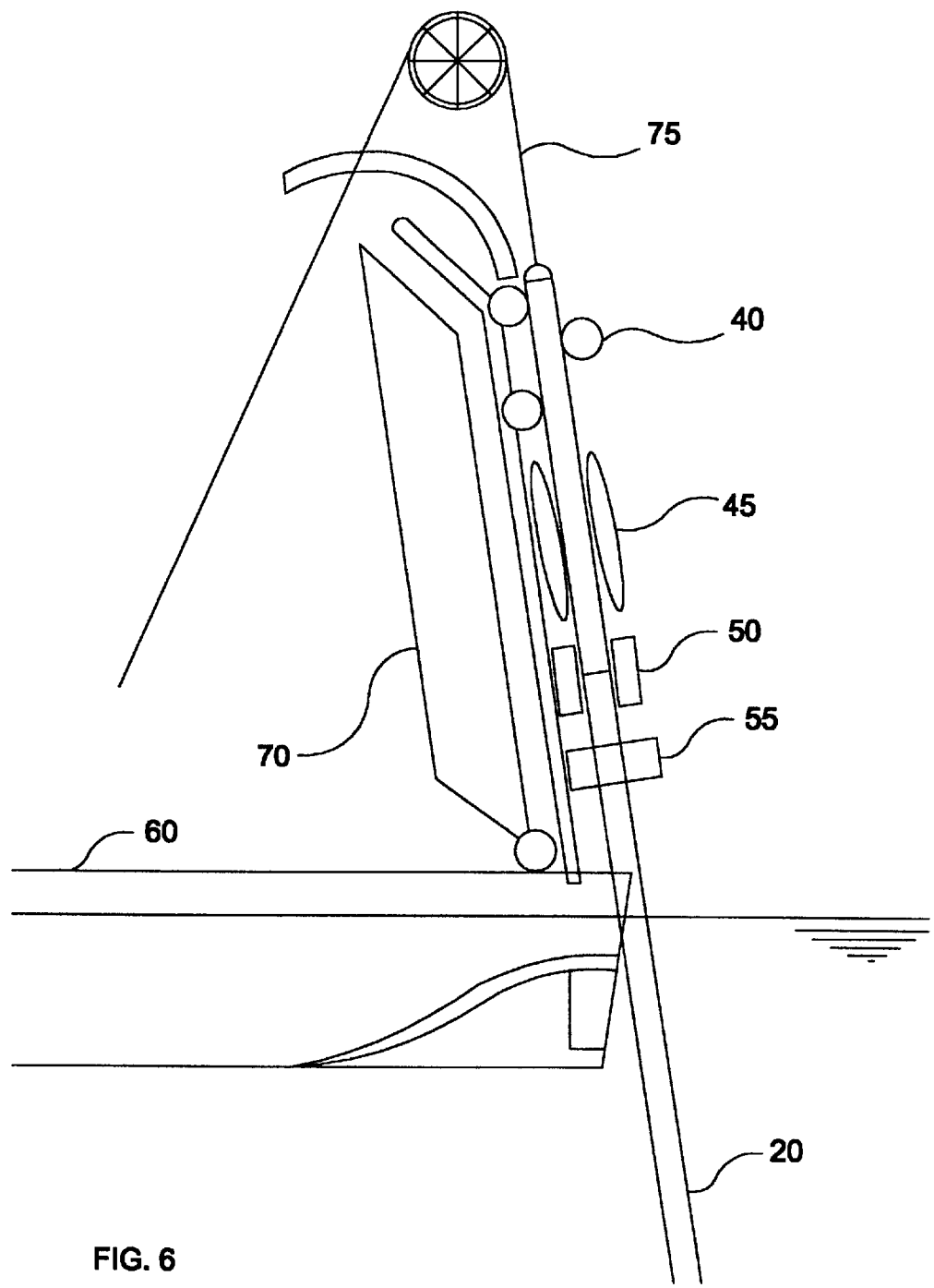
FIG. 6 is a close-up side view showing the start of launching the length of pipe shown in FIG. 5 after this has been welded to the suspended metal pipe.
Figure 7:
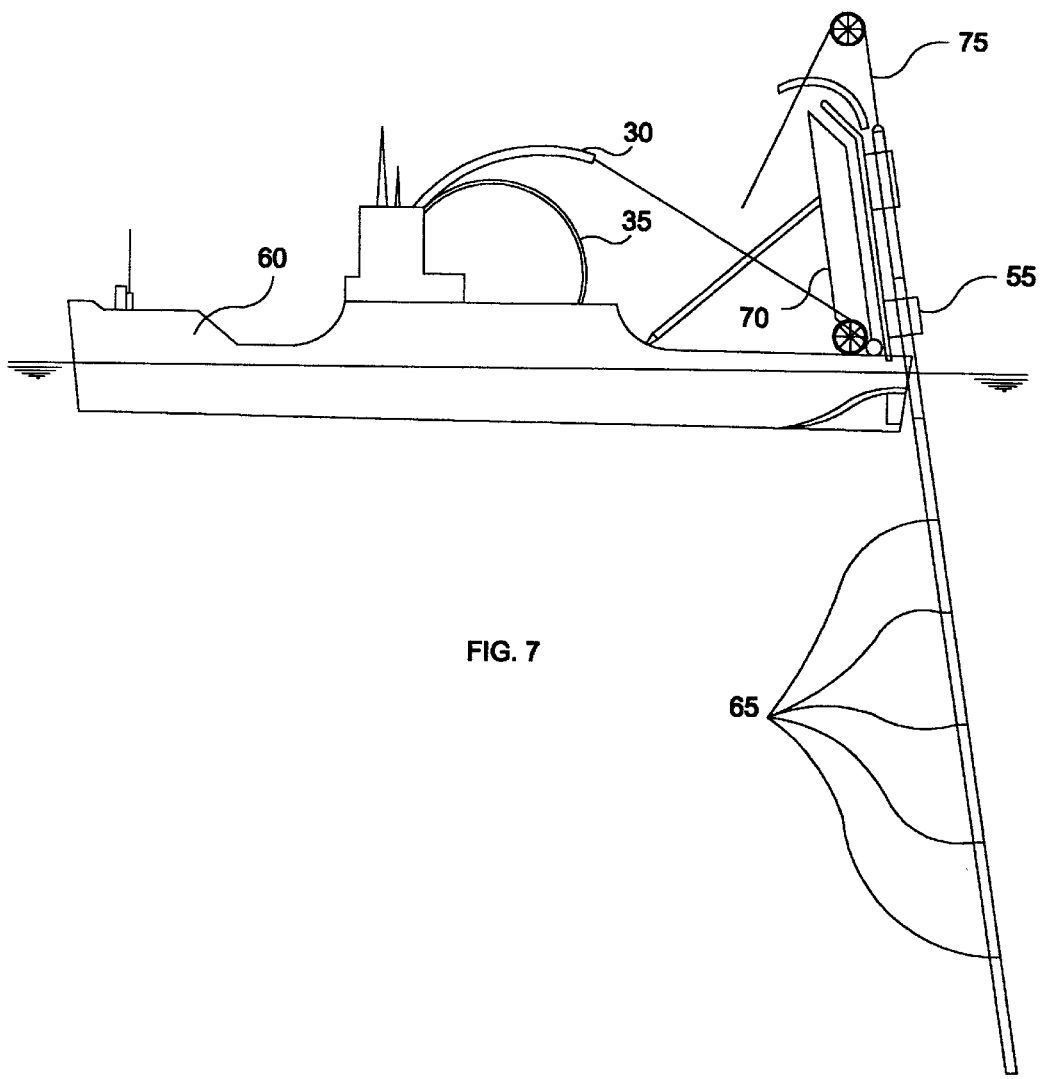
FIG. 7 is a side view showing a set of lengths of pipe welded to the metal pipe suspended as shown in FIGS. 5 and 6.
Figure 8:
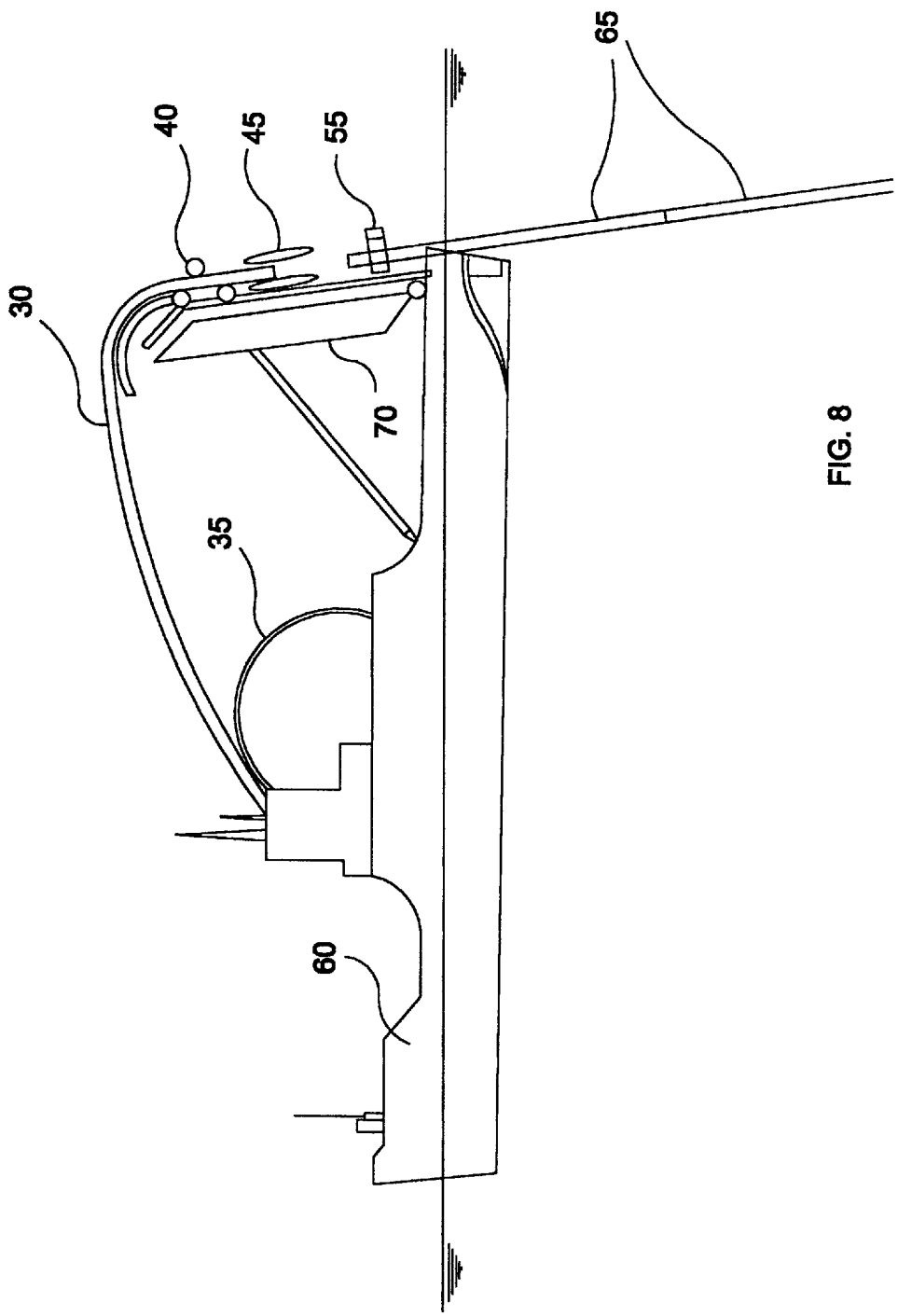
FIG. 8 is a side view showing the last welded length as shown in FIGS. 5, 6 and 7, supported by the supporting bracket, ready to be welded to one end of a reeled length of metal pipe in order to restart the process of lowering the metal pipe by the reeling method.

A specific embodiment of this method will be described in greater detail below with reference to FIGS. 3–8:

A) initially the lengths of metal pipe for the pipe which will be launched onto the ocean bed are fabricated at an onshore base. In these operations the pipes are welded and wound onto a receiving device or drum, using known techniques, in such a way that at least one drum containing the length intended to be launched onto the seabed is obtained. It is usually necessary for the launching vessel to perform more than one launching operation to lay the metal pipe on the seabed because of the great length of pipe which has to be laid and the capacity limitations of the launching vessel in supporting the weight of all the metal pipe which has to be laid on the seabed, B) when the vessel has been prepared for the final operation of laying the length of metal pipe on the seabed, the length relating to the intermediate length of catenary riser (SCR) 5 (the part marked 30 in FIG. 1) has to be wound as the innermost layer on the drum, and the remainder of the pipe which will be laid on the seabed (pipe 20 in FIG. 1) has to be wound as the outer layer, C) when at sea, the section of pipe which is wound as the outermost layer on the drum is launched onto the seabed. FIG. 3 shows a vessel 60 launching an undersea metal pipe 20 which is the last length that has to be laid on the seabed. The pipe is unwound from drum 35 and passes through a straightener 40, pulled by a puller 45, D) the end of the final length of pre-reeled pipe which has to be laid on the seabed is supported by a supporting bracket 55, as shown in FIG. 4. From this point onwards the reeling method for launching the metal pipe is interrupted and the J-lay method is used so that the straight sections forming the critical length of the stretch of catenary riser (SCR) 5 in contact with the seabed (TDR) can be welded, E) the first straight section 65 of this critical length is fitted onto launching ramp 70, as shown in FIG. 5, and is connected to the column of metal pipe 20 suspended by supporting bracket 55. The operations of coupling, preheating, welding, weld inspection and coating of the welded section are performed at a working station 50 located between puller 45 and supporting bracket 55. It should be pointed out that all the necessary resources to ensure required quality, such as, for example, a semi-automatic welding and ultrasound system must be provided on board vessel 60 for welding and inspection to the standards required for this type of connection, F) after the first straight section 65 has been welded to metal pipe 20, as shown in FIG. 6, the weld is inspected to check weld quality. After the weld has been approved the procedures for welding the next straight section 65 can then be started. For this a supporting and lowering system 75 is connected to the upper part of first straight section 65 to support all the metal pipe. The supporting and lowering system 75 is here represented by a cable and pulley arrangement, G) then supporting bracket 55 is operated so as to leave the entire suspended metal pipe momentarily unsupported by the supporting bracket 55, and the latter is then suspended by means of the supporting and lowering system 75, H) the supporting and lowering system 75 is then operated to enable straight section 65 which has just been welded to be launched, together with metal pipe 20, until its upper end is located at working station 50 in such a way that a new straight section 65 can be welded to it, I) supporting bracket 55 is then operated to compress recently fitted straight section 65, and then supports the weight of all the suspended metal pipe, J) support and lowering system 75 is then disconnected from the recently fitted upper part of straight section 65 so that the next straight section 65 which is to be installed can be handled, K) the stages referred to above by E, F, G, H, I and J are repeated until launching of the length of pipe comprising the lower length of catenary riser (SCR) 5 in contact with the seabed (TDR) has been completed. FIG. 7 shows various straight sections 65 welded together, L) after the last straight section of the critical length relating to the length in contact with the seabed (TDR) has been welded, intermediate length 30 of catenary riser (SCR) 5, which remains wound as the innermost layer on drum 35 is then welded to last straight section 65 as shown in FIG. 8. From this point on the intermediate length of catenary riser (SCR) 5 is unwound from drum 35 and passed through straightener 40, pulled by puller 45, M) when all the intermediate length of catenary riser (SCR) 5 has been launched by the reeling method, the final critical length relating to the top length of catenary riser (SCR) 5 has to be launched by the J-lay method. The stages referred to above by E, F, G, H, I and J are then repeated until launching of the length of pipe comprising the top length of catenary riser (SCR) 5 has been completed.

Use of the method proposed here makes it possible for a single vessel to launch all the metal pipe comprising both the length resting on the seabed and the catenary riser (SCR) length 5, which in itself represents a cost saving. In addition to this, through use of the reeling method to launch the intermediate length of catenary riser (SCR) 5, the time for installation of the latter is reduced, providing a significant saving for the entire process.

The term "straight section" has been used above to refer to the non-pre-reeled pipe sections 65 which are attached according to the J-lay method. However, although preferable, it is not essential that they are straight and they could equally be curved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of attaching a first pipe section to a pre-reeled pipe, the method comprising:

unreeling said pre-reeled pipe so as to launch it in the sea from a vessel;

straightening said un-reeled pipe and thereby imparting a characteristic stress profile which is formed in the coiling/straightening process;

supporting said unreeled pipe near a top end thereof in a first support located on said vessel;

attaching said first pipe section to the end of said supported unreeled pipe using attaching means on said vessel;

wherein said first pipe section does not have said characteristic stress profile.

2. A method according to claim 1, wherein said first non-pre-reeled pipe section is straight.

3. A method according to claim 1, wherein said step of supporting in said first support comprises gripping the pipe in a fixed supporting bracket.

4. A method according to claim 1, wherein said step of attaching comprises welding.

5. A method according to claim 4, wherein said step of welding comprises:

pre-heating;

welding;

weld inspecting; and coating the pipe section.

6. A method according to claim 1, wherein said first pipe section comprises a plurality of metal pipes welded together.

7. A method according to claim 1, further comprising supporting said first pipe section near a top end thereof; and attaching a second pipe section to the end of said first pipe section using attaching means on said vessel;

wherein said second pipe section does not have said characteristic stress profile.

8. A method of attaching a first pipe section to a pre-reeled pipe, the method comprising unreeling said pre-reeled pipe so as to launch it in the sea from a vessel;

supporting said unreeled pipe near a top end thereof in a first support located on said vessel;

attaching said first pine section to the end of said supported unreeled pipe using attaching means on said vessel;

supporting said first pipe section near a top end thereof in a second support;

releasing said first support;

lowering said first pipe section with the unreeled pipe attached thereto;

supporting in said first support said first pipe section near said top end thereof.

9. A method according to claim 8, further comprising:

attaching a second pipe section to the end of said first pipe section;

supporting in said second support said second pipe section near a top end of said second pipe section;

releasing said first support so as to no longer support said first pipe section;

lowering said second pipe section with the first pipe section attached thereto;

supporting in said first support said second pipe section near said top end of said second pipe section.

10. A method according to claim 9, further comprising:
a) attaching a third pipe section to the end of said second pipe section;
b) supporting in said second support said third pipe section near a top end of said third pipe section;
c) releasing said first support so as to no longer support said second pipe section;
d) lowering said third pipe section with the first pipe section attached thereto;
e) supporting in said first support said third pipe section near said top end of said third pipe section.

11. A method according to claim 8, wherein said step of supporting in said second support comprises suspending the pipe using a cable.

12. A method of attaching a pre-reeled pipe to a non-pre-reeled pipe section, the method comprising:
supporting in a first support located on a vessel said non-pre-reeled pipe section near a top end of said non-pre-reeled pipe section;
unreeling part of said pre-reeled pipe on said vessel;
straightening said unreeled part of said pre-reeled pipe and thereby imparting a characteristic stress profile which is formed in the coiling/straightening process;
attaching one end of said unreeled part of said pre-reeled pipe to the end of said supported pipe section using attaching means on said vessel;
wherein said pipe section does not have said characteristic stress profile.

13. A method according to claim 12, further comprising:
unreeling the rest of said pre-reeled pipe and supporting said unreeled pipe in said first support near a top end of said unreeled pipe.

14. A method of installing an undersea pipe system, comprising:
unreeling a first pre-reeled pipe so as to launch it in the sea from a vessel;
supporting said first unreeled pipe near a top end thereof in a first support located on said vessel;
attaching a first non-pre-reeled pipe section to the end of said supported pipe using attaching means on said vessel;
supporting said first non-pre-reeled pipe section near a top end thereof; and
attaching at least one additional non-pre-reeled pipe section to the end of said first non-pre-reeled pipe section using said attaching means on said vessel.

15. A method according to claim 14, further comprising:
supporting in said first support a final said additional non-pre-reeled pipe section near a top end of said final non-pre-reeled pipe section;
unreeling part of a second pre-reeled pipe on said vessel;
attaching one end of said second unreeled pipe to the end of said supported non-pre-reeled pipe section using attaching means on said vessel.

16. A method according to claim 15, further comprising:
supporting said second unreeled pipe near a top end thereof in said first support located on said vessel; and
attaching at least one further non-pre-reeled pipe section to the end of said supported second unreeled pipe using attaching means on said vessel.

17. A method according to claim 15, wherein said second pre-reeled pipe is initially reeled on a common spool to said first pre-reeled pipe.

18. A method according to claim 14, wherein said first pre-reeled pipe is straightened after unreeling thereby imparting a characteristic stress profile which is formed in the coiling/straightening process, and wherein said first non-pre-reeled pipe section does not have said characteristic stress profile.

19. A method according to claim 14, further comprising:
attaching part of said pipe system to the sea bed, and attaching another part to a floating unit.

20. A vessel for launching two types of piping which together constitute an underwater pipe system, said vessel comprising:
a reel for holding at least one length of coiled piping;
guiding/retaining apparatus comprising:
a pipe straightener for straightening the coiled piping as it is unreeled;
a puller for urging the pipe in a substantially downward direction; and
a support for holding the pipe and supporting the pipe's weight;
said vessel further comprising a launching ramp for presenting discrete straight non-pre-reeled pipe sections to said guiding/retaining apparatus; and
a working station having a connecting apparatus adapted to connect a non-pre-reeled pipe section to a supported end of an unreeled pipe and adapted to connect an unreeled pipe to a supported end of a non-pre-reeled pipe section, wherein said working station is positioned downstream of the straightener, between said straightener and said support.

21. A vessel according to claim 20, wherein said working station is positioned between said support and said puller.

22. A vessel according to claim 20, wherein said working station comprises welding equipment.

23. A vessel according to claim 20, further comprising a further support which is able to support a pipe's weight while the pipe moves in a substantially vertical direction.

24. A vessel according to claim 23, wherein said further support comprises a cable wrapped around a pulley.

25. A vessel according to claim 20, wherein said launching ramp is moveable between a first substantially horizontal position and a second substantially vertical position so as to be capable of presenting pipe sections to said guiding/retaining apparatus.

26. A vessel according to claims 20, wherein said reel holds two separate lengths of coiled piping.

27. A vessel according to claim 20, wherein said support is a supporting bracket positioned at the bottom of said guiding/retaining apparatus.

28. An undersea pipe system installed using a vessel comprising:
a reel for holding at least one length of coiled piping;
guiding/retaining apparatus comprising:
a pipe straightener for straightening the coiled piping as it is unreeled;
a puller for urging the pipe in a substantially downward direction; and
a first support for holding the unreeled pipe and supporting the pipe's weight;
said vessel further comprising a launching ramp for presenting discrete straight non-pre-reeled pipe sections to said guiding/retaining apparatus; and
a working station having a connecting apparatus adapted to connect separate non-pre-reeled and unreeled pipe sections together, wherein said working station is positioned downstream of the straightener, between said straightener and said support, said undersea pipe system being installed using the following method:

unreeling a said coiled pipe so as to launch it in the sea from a vessel;

straightening said un-reeled pipe and thereby imparting a characteristic stress profile which is formed in the coiling/straightening process;

supporting a top end of said unreeled pipe in said first support; and attaching a first non-pre-reeled pipe section to the top end of said supported unreeled pipe using said connecting apparatus;

wherein said first pipe section does not have said characteristic stress profile.

29. An undersea pipe system comprising:

a section of pipe on the sea bed having a characteristic stress profile which has been formed from a coiling/straightening process;

a first series of pipe sections connected to said sea bed section, said first series of pipe sections not having the characteristic stress profile typical of coiled and straightened pipe sections;

a further section of coiled and straightened piping connected to said first series of pipe sections;

a second series of pipe sections connected to said further section of coiled and straightened piping, said second series of pipe sections not having said characteristic stress profile;

wherein said second series of pipe sections is connected to a floating unit.

30. An undersea pipe system according to claim 29, wherein all said pipe sections are metallic and all attachments and connections are welded.

* * * * *